(12) United States Patent
Montgomery et al.

(10) Patent No.: US 8,959,188 B2
(45) Date of Patent: Feb. 17, 2015

(54) METHOD, SYSTEM, AND APPARATUS FOR CONFIGURING NETWORK ACCOUNTS ON DEVICES FOR USE THEREWITH

(75) Inventors: Gregory Montgomery, Sugar Hill, GA (US); Jean-Francois Merlet, Santa Cruz, CA (US)

(73) Assignee: Nokia Corporation, Espoo (FI)

( * ) Notice: Subject to any disclaimer, the term of this patent is extended or adjusted under 35 U.S.C. 154(b) by 330 days.

(21) Appl. No.: 12/243,688

(22) Filed: Oct. 1, 2008

(65) Prior Publication Data

US 2010/0082777 A1    Apr. 1, 2010

(51) Int. Cl.
| | |
|---|---|
| G06F 15/177 | (2006.01) |
| H04L 12/24 | (2006.01) |
| H04L 12/58 | (2006.01) |
| H04L 29/08 | (2006.01) |

(52) U.S. Cl.
CPC .......... *H04L 41/085* (2013.01); *H04L 41/0866* (2013.01); *H04L 41/0876* (2013.01); *H04L 51/22* (2013.01); *H04L 51/28* (2013.01); *H04L 51/38* (2013.01); *H04L 67/34* (2013.01); *H04L 67/04* (2013.01)
USPC ........... 709/220; 709/203; 709/206; 709/222; 709/224

(58) Field of Classification Search
CPC ... H04L 51/22; H04L 41/0806; H04L 41/085; H04L 41/0853; H04L 41/0876; H04L 67/34
USPC ......... 709/206, 223, 245, 220–222, 203, 227, 709/228, 230, 217, 219, 224; 705/4
See application file for complete search history.

(56) References Cited

U.S. PATENT DOCUMENTS

| | | | |
|---|---|---|---|
| 6,138,180 A * | 10/2000 | Zegelin | 710/11 |
| 6,958,996 B2 * | 10/2005 | Xiong | 709/222 |
| 7,284,045 B1 | 10/2007 | Marl et al. | |
| 7,409,426 B2 * | 8/2008 | Gill et al. | 709/206 |
| 7,516,211 B1 * | 4/2009 | Gourlay et al. | 709/224 |
| 8,140,358 B1 * | 3/2012 | Ling et al. | 705/4 |

(Continued)

FOREIGN PATENT DOCUMENTS

| | | |
|---|---|---|
| WO | WO 98/26548 | 6/1998 |
| WO | WO 02/49373 A2 | 6/2002 |
| WO | 2007/040526 A1 | 4/2007 |

OTHER PUBLICATIONS

International Search Report and Written Opinion, PCT/FI2009/050731, Dec. 4, 2009, pp. 1-13.

(Continued)

*Primary Examiner* — Ramy M Osman
(74) *Attorney, Agent, or Firm* — Ditthavong & Steiner, PC

(57) ABSTRACT

Creating service accounts involves receiving an account identifier entered by a user via a user interface to initiate registering a user device with a network account. One or more host names are determined based on a domain name portion of the account identifier. The one or more host names need not be preconfigured on the user device. Connections are attempted with each of the one or more host names. Each of the connection attempts uses one or more application protocols associated with a type of the network account. It is determined that at least one of the connection attempts results in a successful connection, and a user account is configured on the user device based on a host and protocol combination associated with the successful connection.

23 Claims, 6 Drawing Sheets

(56) References Cited

U.S. PATENT DOCUMENTS

| | | | |
|---|---|---|---|
| 8,218,478 B2* | 7/2012 | Lim et al. | 370/328 |
| 8,495,151 B2* | 7/2013 | Bodapati et al. | 709/206 |
| 8,572,716 B2* | 10/2013 | Chander et al. | 726/10 |
| 2003/0202513 A1* | 10/2003 | Chen et al. | 370/390 |
| 2004/0082326 A1 | 4/2004 | Shaw et al. | |
| 2004/0127204 A1 | 7/2004 | Belmont | |
| 2004/0128548 A1* | 7/2004 | Basha et al. | 713/201 |
| 2004/0132429 A1* | 7/2004 | Gill et al. | 709/206 |
| 2006/0092860 A1* | 5/2006 | Higashitaniguchi et al. | 370/255 |
| 2006/0200524 A1* | 9/2006 | Costenaro et al. | 709/206 |
| 2007/0204089 A1* | 8/2007 | Proctor | 710/301 |
| 2008/0096507 A1* | 4/2008 | Erola | 455/187.1 |
| 2008/0256197 A1* | 10/2008 | Deshpande | 709/206 |
| 2008/0307077 A1* | 12/2008 | Langoulant et al. | 709/222 |
| 2008/0318553 A1* | 12/2008 | Wong | 455/415 |
| 2009/0093242 A1* | 4/2009 | Bhalekar et al. | 455/418 |
| 2009/0222582 A1* | 9/2009 | Josefsberg et al. | 709/245 |
| 2010/0082777 A1* | 4/2010 | Montgomery et al. | 709/220 |
| 2010/0169443 A1* | 7/2010 | Roundtree et al. | 709/206 |
| 2010/0279733 A1* | 11/2010 | Karsten et al. | 455/552.1 |

OTHER PUBLICATIONS

DS Development, "Incoming and Outgoing Mail Server Settings for Hotmail, Yahoo!, Mail, Gmail, AOL and more", printed from the internet Aug. 20, 2008.

U.S. Appl. No. 12/038,460, Salminen, filed Feb. 27, 2008.

Court Decision, Heisei 19, Gyoke, No. 10239 dated Feb. 29, 2008, pp. 1-32. Corresponding to Cite No. 3.

Court Decision, Heisei 19, Gyoke, No. 10369 dated Jun. 24, 2008, pp. 1-37. Corresponding to Cite No. 3.

Office Action for related Japanese Application No. 2009-218579 dated Apr. 3, 2012, pp. 1-9.

Court Decision, Heisei 19, Gyoke, No. 10239, dated Jun. 24, 2008, pp. 1-37.

Office Action with English Summary for Chinese Application No. 200980138885.9, dated Apr. 17, 2013, pp. 1-37.

Extend European Search Report for corresponding European Application No. 09 81 7331, dated Feb. 18, 2014, 10 pages.

Office Action for corresponding Chinese Patent Application No. 200980138885.9, dated Sep. 30, 2013, 4 pages (English Language Summary Included).

* cited by examiner

METHOD, SYSTEM, AND APPARATUS FOR CONFIGURING NETWORK ACCOUNTS ON DEVICES FOR USE THEREWITH

FIELD OF THE INVENTION

This invention relates in general to computing devices, and more particularly to storage mediums, apparatuses and methods for facilitating creation of network accounts and configuration of devices associated therewith.

BACKGROUND

Mobile computing devices are increasingly being adopted by mainstream users. The combination of easy portability, increasing network availability, and large local storage capabilities will result in mobile devices becoming the primary computing device for many users. Today, such wireless devices are being used for a variety of different types of communication. For example, current and anticipated mobile phone technologies have transformed wireless devices into powerful tools capable of capturing and communicating voice, data, images, video, and other multimedia content. Mobile phones now often include data messaging capabilities such as text messaging such as short message service (SMS), multimedia messaging, instant messaging, e-mail, voice over internet protocol (VoIP), etc.

However, these messaging capabilities often require corresponding messaging accounts. For example, a mobile phone user who wants to send and/or receive e-mails via his/her mobile phone must establish some e-mail account in order to engage in e-mail communication. For those individuals who may already have an e-mail account(s) established, they must try to recall account settings and re-enter those settings in the mobile device. Because years may pass from when a user first establishes the account and when they may want to use that account on a different device, significant research must be performed to find the account setup details, e.g., server host names and associated protocols and settings.

Another issue seen when configuring an account on a new mobile device is that mobile user interface mechanisms may be more difficult to manipulate. For example, many mobile phones do not have a standard keyboard (e.g., QWERTY keyboard), but rather have a numeric keypad with alpha character capabilities. It can be difficult and time-consuming to enter the information required to configure an account via such a limited UI device.

SUMMARY

The present invention discloses a system, apparatus and method for creation of service provider accounts and configuration of devices associated therewith. In one aspect, a method involves receiving an account identifier entered by a user via a user interface to initiate registering a user device with a network account. One or more host names are determined based on a domain name portion of the account identifier. The one or more host names are not preconfigured on the user device. Connections are attempted with each of the one or more host names. Each of the connection attempts uses one or more application protocols associated with a type of the network account. It is determined that at least one of the connection attempts results in a successful connection, and a user account is configured on the user device based on a host and protocol combination associated with the successful connection.

In another aspect, an apparatus includes a processor programmed with executable instructions that cause the apparatus to receive a user-entered account identifier, and determine one or more host names based on a domain name portion of the account identifier. The host names are not preconfigured on the apparatus. The apparatus further attempts connections with each of the one or more host names. Each of the connection attempts uses one or more application protocols associated with a type of the network account. The apparatus determines that at least one of the connection attempts results in a successful connection, and configures a user account on the apparatus based on a host and protocol combination associated with the successful connection.

In another aspect, a computer-readable storage medium includes instructions which are executable by an apparatus for performing operations that include: a) receiving an account identifier entered by a user via a user interface to initiate registering a user device with a network account; b) determining one or more host names based on a domain name portion of the account identifier (the host names are not preconfigured on the apparatus); c) attempting connections with each of the one or more host names (each of the connection attempts uses one or more application protocols associated with a type of the network account); d) determining that at least one of the connection attempts results in a successful connection; and e) configuring a user account on the user device based on a host and protocol combination associated with the successful connection.

In another aspect, an apparatus includes: a) means for receiving an account identifier entered by a user via a user interface to initiate registering a user device with a network account; b) means for determining one or more host names based on a domain name portion of the account identifier (the host names are not preconfigured on the apparatus); d) means for attempting connections with each of the one or more host names (each of the connection attempts uses one or more application protocols associated with a type of the network account); e) means for determining that at least one of the connection attempts results in a successful connection; and f) means for configuring a user account on the user device based on a host and protocol combination associated with the successful connection.

The methods, apparatus, and computer-readable media above may include any combination of the following features. In one variation, determining the one or more host names based on a domain name portion of the account identifier involves prefixing the domain name portion of the account identifier with one or more prefixes determined based on the type of the network account. In such a case, after receiving the user-entered account identifier and before determining the one or more host names based on the domain name portion, the following operations may be performed: a) access a database of predetermined host names to determine a known host that handles the network account; b) if the known host is determined from the database, configuring the user account on the user device using the known host; and c) if the known host is not determined from the database, configuring the user account on the user device based on determining the one or more host names based on the domain name portion of the account identifier.

In any of the disclosed variations, the network account may include an email account and the account identifier comprises an email address. In such a case, determining the one or more host names based on the domain name portion of the account identifier may involve a) determining, via a domain name service, one or more mail exchange records associated with the domain name portion of the account identifier; and b)

determining a simple mail transport protocol (SMTP) host name based on the one or more exchange records. In these variations, determining the one or more host names may also involve determining the one or more host names based on the SMTP host name. Also in these variations, determining the one or more host names based on the host name of the SMTP host name may involve determining one or more incoming email host names based on a domain name portion of the SMTP host name (the one or more email host names are not preconfigured on the user device). Also in these variations, a domain name portion of the SMTP host name may be different than the domain name portion of the account identifier. In such a case, determining the one or more host names based on the host name of the SMTP host name may involve accessing, based on the SMTP hostname, a database of predetermined host names to determine the host and protocol combination.

In all of the above variations, the method, apparatus, and computer-readable media may perform updating a database with the host and protocol combination associated with the successful connection. In such a case the database is used to configure other user accounts with the host and protocol combination, wherein the other user accounts are associated with the domain name portion of the account identifier. Also in the above variations, the method, apparatus, and computer-readable media may perform receiving account authentication data entered by the user via the user interface, and attempting connections with each of the one or more host names further involves attempting authentication with each of the one or more host names using the account authentication data.

In all of the above variations, the connection attempts may result in a plurality of successful connections. In such a case, the method, apparatus, and computer-readable media may cause a preferred host and protocol combination associated with the plurality of successful connections to be determined, and further configure the user account based on the preferred host and protocol combination. In another variation on the above combinations, the method, apparatus, and computer-readable media may perform configuring multiple user accounts based on the one or more successful connections.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

The present disclosure is directed to methods, systems, and apparatus that facilitate the creation of service provider accounts and configuration of devices associated with the accounts. For example, various disclosed embodiments facilitate the configuration, on a new device, of an existing account for services such as e-mail, instant messaging (IM), social networking, voice-over-Internet-Protocol (VoIP), wireless local area network (WLAN), photo sharing, content subscription services etc. As indicated above e-mail service is one service in which the invention can be used, to make it easy and convenient for users to configure e-mail messaging on their mobile devices.

Using email as one example, end users want to configure email programs (such as Outlook and mobile device email clients) to access email from their mail providers (e.g. Hotmail™, Yahoo™, Gmail™, etc.). However, many users do not know the POP or IMAP server that the email provider uses, so they are either unable to configure their email client or they have to call or search for support. The server information may be found from their email provider's Web site or other documentation. However such documentation is not always easy to find, and may not cover the particular mail client that the user wants. Also, such documentation use jargon/acronyms that are inconsistently applied and/or confusing to users. This stops many users from being able to configure their email clients.

Figure 1:
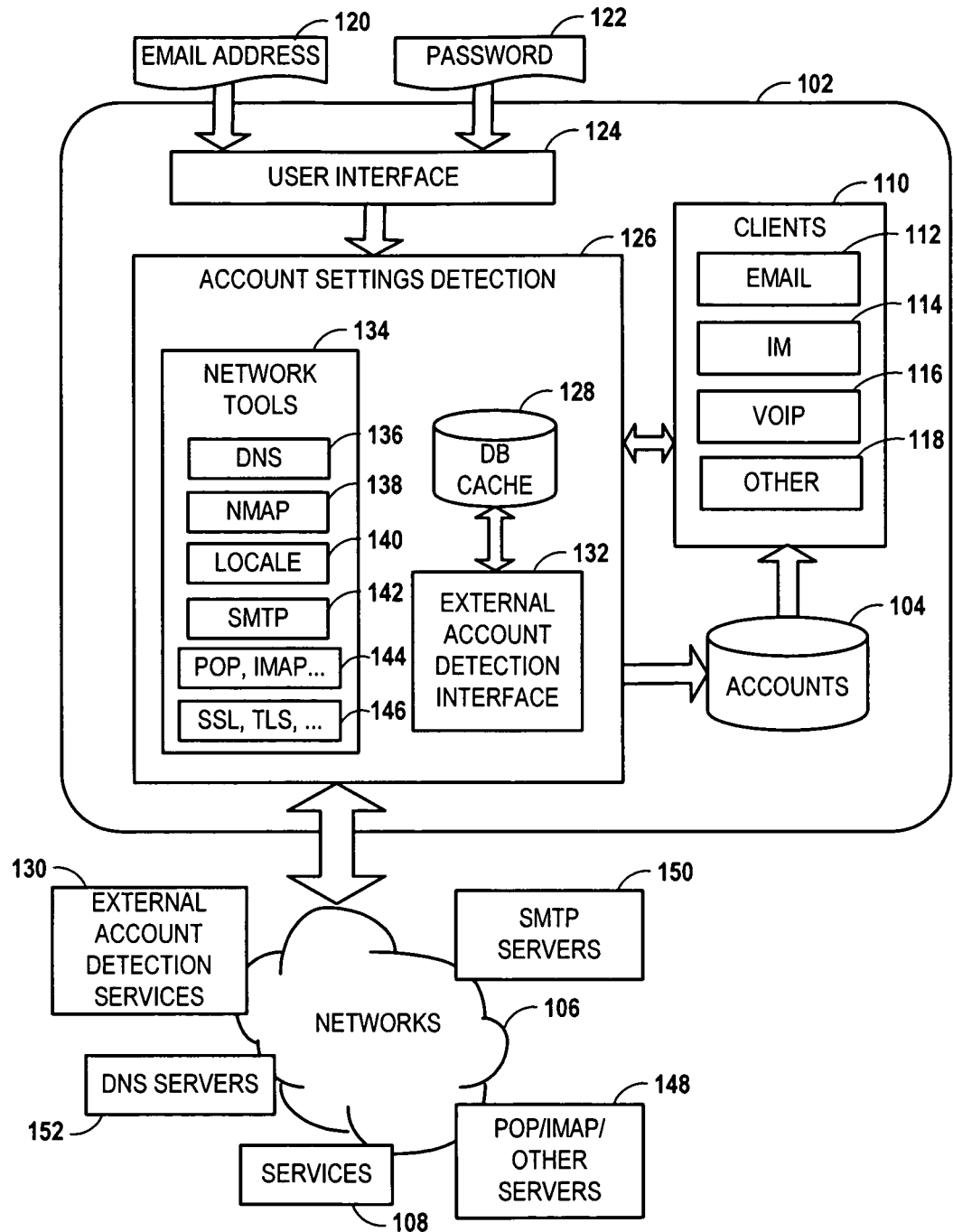
FIG. 1 is a block diagram illustrating an architecture according to embodiments of the invention.

In FIG. 1, a block diagram shows a user device 102 that may facilitate local account creation according to embodiments of the invention. The device 102 may include any user operable device, including a mobile apparatus such as cellular phone, Internet tablet, navigation unit, media player, personal digital assistant (PDA), etc. Generally, a user may wish to configure and store account data 104 associated with various services 108 available via a network 106. The services 108 may be accessed by general- or special-purpose clients 110 running on the device 102. Examples of clients 110 include email 112, text or instant messaging (IM) 114, VoIP 116, and other clients 118. The other clients 118 may include other specialized clients (e.g., media subscription) or general-purpose clients (e.g., browsers, shells).

For purposes of illustration, the account configuration functions of the user device will be described in terms of an email account. Email is a widely used electronic messaging format that requires significant client configuration. Not only must a user know their email address 120, they must also know username (if different than the address 120) and password 122 for accessing incoming and outgoing mail servers, and must know addresses and other details of those servers (e.g., mail protocol, security). Also, many integrated services providers (e.g., Yahoo!™, Google™) may use the email authentication for accessing other network services, such as instant messaging and application servers. As such, the email account data (e.g., email address 120 and password 122) may be used as the starting point for configuring multiple account types.

As mentioned above, an account setup (e.g., when the device 102 is first used) may involve the entry of an email address 120 (or other account identifier) and optionally a password 122 into a user interface 124. This user interface 124 often includes a keypad or touch screen, although other means of user data entry, such as voice recognition, bar code scanning, optical character recognition, motion detection, may also be used. The entered data 120, 122 is passed to an account settings detection tool 126 that includes the logic needed to set up automatically a local account and store the settings in the account database 104.

The account settings tool 126 may first try to utilize predetermined data for setting up the account. For example, a database cache 128 may include data (e.g., server addresses, protocols) for well-known service providers, such as Yahoo!™ mail and Gmail™. For less well-known providers, a network account detection service 130 may be accessed by way of an interface 132. The network detection service 130 may be able to contain a far larger database of account settings than would be practical to contain in the local database 128. Further, the network detection service 130 may be easier to keep up to date than the database, which may be locked into particular versions for reasons related to manufacturing, distribution, software quality assurance, localization, etc. The interface 132 may be used to access the network service 130 for other purposes besides initial account configuration, such as to update preconfigured entries in the database cache 128.

Even a well-provisioned detection service 130 may not be able account for all possible email accounts that might be accessed by device 102. For example, many home users and small businesses obtain their own domain names and maintain their own email services, and it may be impractical to try and register/detect all of those accounts via the service 130 in many cases. As a result, the account setting detection tool 126 may use additional network tools 134 in an attempt to automatically determine account data needed to set up an email account.

For example, the account setting detection tool 126 may try to determine the appropriate email servers for the account based on the domain part of the email address 120. The domain part of the address is the part of the email address following the ampersand ("@"). For example, in the address "b.baggins@theshire.com," the text "b.baggins" preceding the ampersand is the local part, and "theshire.com" is the domain part. As will be describe in greater detail below, this domain part of the address 120 may provide valuable clues in determining some or all of the desired account information. The programmatic/network tools 134 may assist in determining this additional account data.

The programmatic tools 134 may be included in an operating system and/or utilities of the device 102, or may be particular to the detection tool 126. These tools may include, but are not limited to, domain name service (DNS) lookup service 136, port scanners as represented by "nmap" 138, locale determining services 140, SMTP interfaces 142, client email retrieval interfaces 144 for protocols such as post office protocol (POP) and Internet message access protocol (IMAP), and secure transport layer protocol interfaces 146, such as secure sockets layer (SSL) and transport layer security (TLS). It will be appreciated that other tools may also be utilized, such as interfaces for commonly used protocols such as hypertext transport protocol (HTTP), session initiation protocol (SIP), simple network management protocol (SNMP), etc. Generally, these tools 134 allow determining whether various servers on the network 106 are hosting/supporting the user accounts.

In the realm of email clients 112, two types of servers are often defined for supporting full email functionality. The first type of server is an incoming email server, as represented by POP/IMAP server 148. As will be appreciated in the following discussion, the terms "incoming" and "outgoing" refer to the transfer of email from the perspective of the client 112. The incoming mail servers 148 are generally referred to as mail delivery agents (MDA) that receive and store emails for a mail user agent (MUA), such as email client 112. The second type of server is annotated as an SMTP server 150, which receives outgoing mails from an email client 112. The SMTP server 150 generally performs services of a mail transport agent (MTA), which may involve queuing emails which are received from and/or sent to other MTAs. However, this list of email protocols is not intended to be exhaustive. For example, some email systems such as Microsoft™ Exchange™ and ActiveSync™ define a single server/protocol for both incoming and outgoing emails. Other mail services may also use a single point of entry (e.g., HTTP server) for both sending and receiving emails. Those of skill in the art will recognize that the concepts described herein related to incoming and outgoing mail servers may be equally applicable to such single-server and/or single-protocol email systems.

One task involved in setting up an account on device 102 is to identify the incoming and outgoing servers 148, 150, typically by a hostname that is resolvable to an Internet Protocol (IP) address. The resolving of hostnames to IP addresses (and vice versa) is performed by a DNS server 152. The DNS server 152 maintains mappings of hostnames to IP addresses for a particular domain, and may also maintain mail exchange (MX) records, which specify a server that will accept email for a given domain. As will be described in greater detail hereinbelow, these and other tools may be employed to intelligently assist the user in automatically setting up an account on a user device 102.

This system illustrated in FIG. 1 allows for more advanced email server discovery than currently available. The detection component 126 may employ an algorithm that uses several lookup methods to discover as many email domains as possible, and as much information as possible about each domain. Additionally, if information for a domain cannot be automatically determined from the existing databases 128, 130, the detection component 126 will analyze user-entered settings to determine information the component 126 can add to list 128, 130 of known domains. In such a way, this ensures that only one user per domain will need to provide the detailed settings if the mail servers for the domain cannot be automatically detected. User-entered settings may also be used to update the algorithms used by the components 126 (which may also be updated by way of the cache). For example, algorithms for guessing server names can be updated if a significant number of user-entered server names conform to a predictable pattern that is currently not being used by the tools 134.

In cases where the detection component 126 automatically returns detailed information about the service, the information can vary and be classified for different applications/clients 110 that use the detection component 126. For example, detection component 126 can determine that one application 110 only works with premium accounts of an email domain, but another application 110 works with all accounts for the same domain. The account information (e.g., as in database 128 or server 130) can also be filtered by several different criteria such as operator or country code. This allows the service to be very flexible with the different mail services providing different access according to operator agreements.

Figure 2:
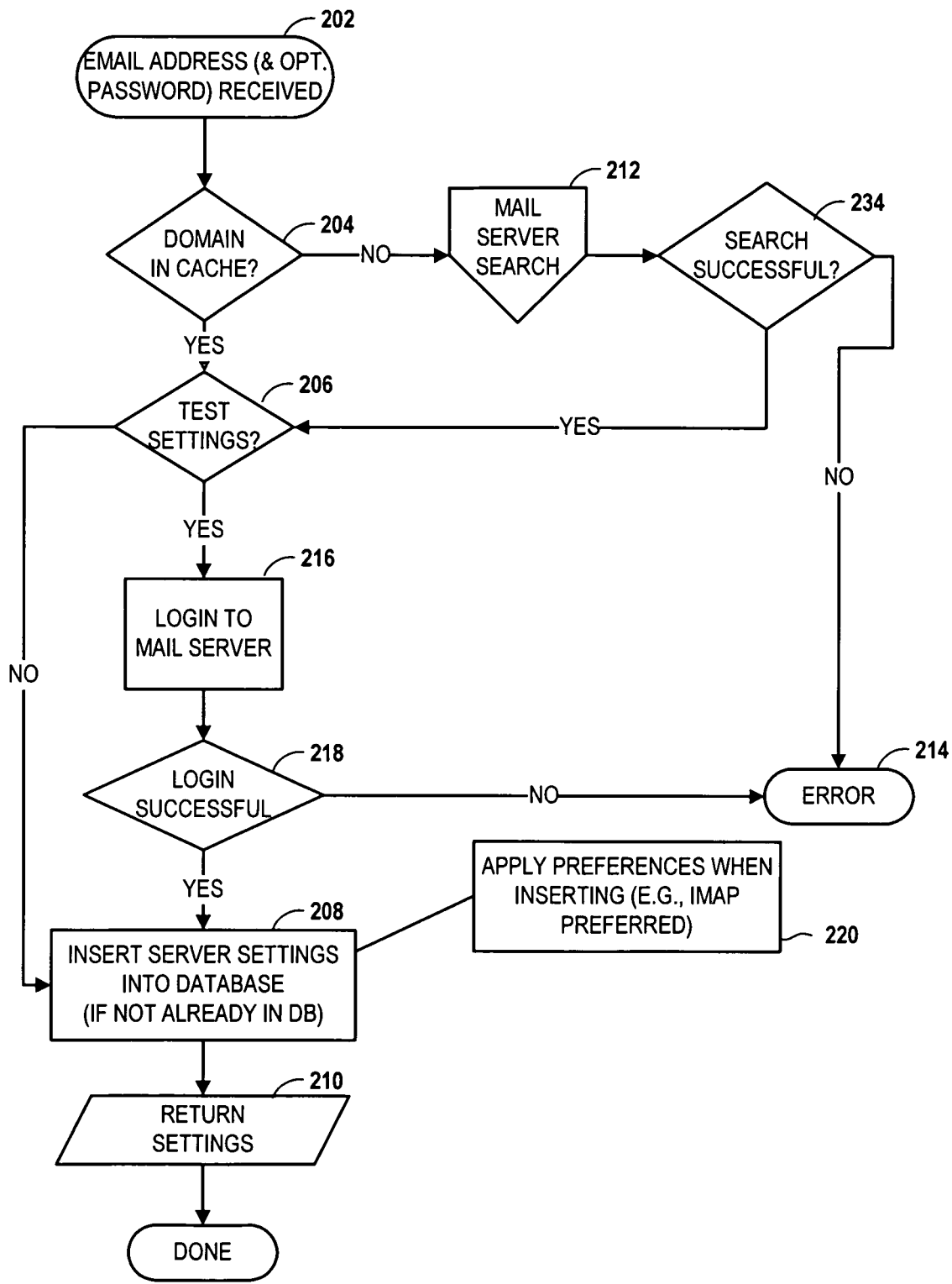
FIG. 2 is a flowchart illustrating a procedure for account configuration according to an embodiment of the invention.

In reference now to FIG. 2, a flowchart illustrates an account detection procedure according to an embodiment of the invention. Generally, the procedure involves determining account settings based on receipt 202 of a user-provided email address and (optional) password, the latter being used to test the settings. Next, the cache is checked 204 to determine whether the domain (as determined from the domain portion of the email address) is available. If the domain information is available, and no testing is to be performed (determined at decision block 206), then cached server settings are returned to the client 210. Note that in this particular situation, there would be no need to insert 208 the settings into the database because they were obtained from the database.

If it is determined 204 that the domain is not in the cache, then a mail server search 212 is performed. The particulars of the search 212 will be described in greater details in the discussion of FIGS. 3-5 below. If the search 212 is not successful, the process exits with an error 214. If the search 212 is successful, then decision block 206 is reached to determine whether testing is performed. In this scenario, testing involves logging in 216 to the target mail server (determined from the cache 204 or advanced search 212) and determining 218 if the login was successful. If not successful, then an error 214 results, otherwise the verified settings may be inserted 208 into the database, and the settings are returned 210 to the calling applications. As noted in block 220, the insertion 208 of settings may involve applying preferences when inserting the settings. For example, if both a POP and IMAP server are found, the database may only desire to insert 208 the IMAP server. In another arrangement, both entries may be inserted 208, but a ranking or preference flag may be added so that one entry may be chosen over another in some situations. The database insertion 208 may include other distinctions for ranking and/or including server data. For example the insertion 208 may consider connection methods (e.g., secure versus non-secure connections), responsiveness (e.g., measure via ping return times), physical location of servers, etc.

Figure 3:
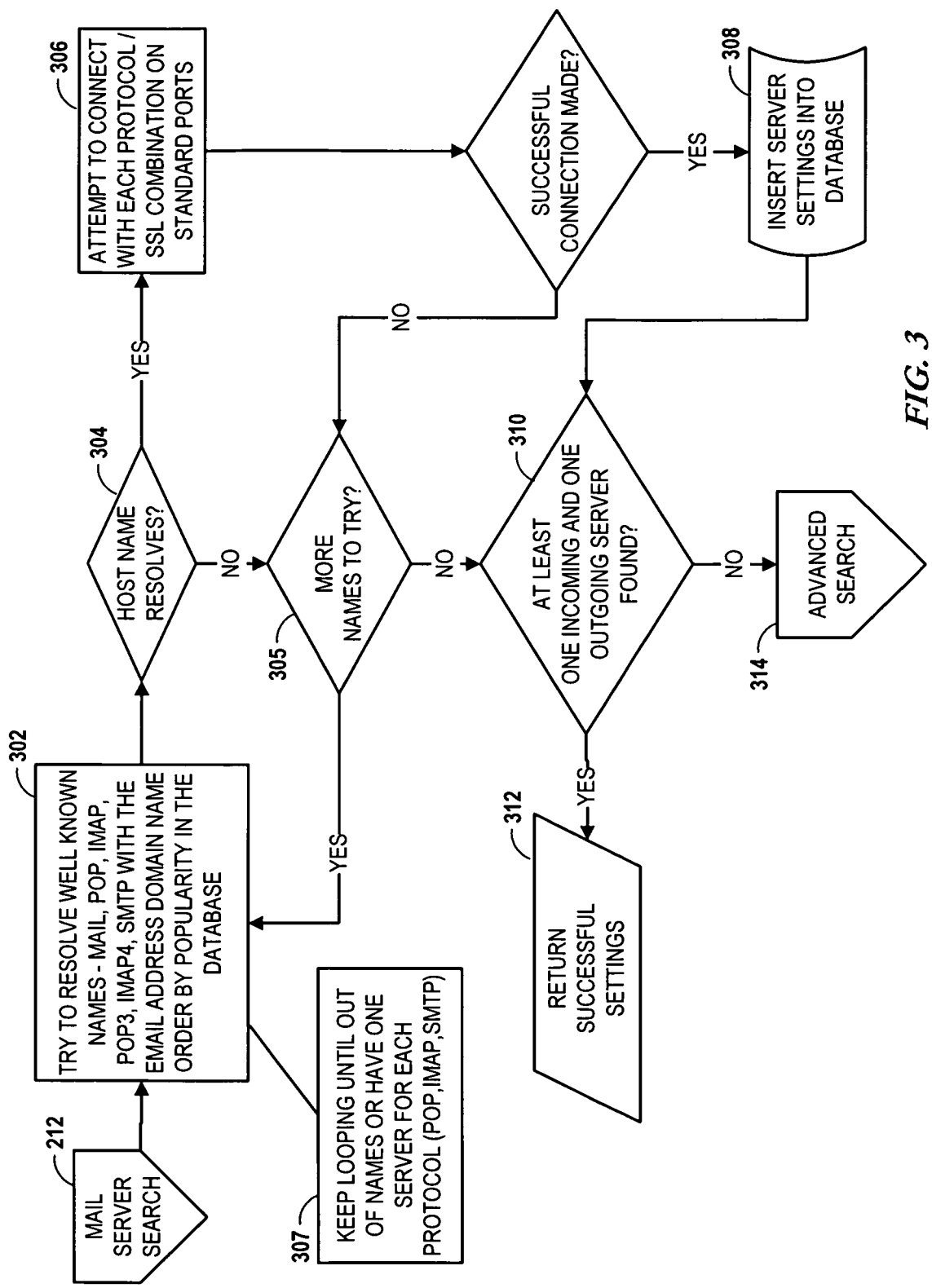
FIG. 3 is a flowchart illustrating a procedure for automatic mail server search according to an embodiment of the invention.

In reference now to FIG. 3, a flowchart shows details of mail server search 212 according to an embodiment of the invention. The search 212 was described in FIG. 2 as part of an automated account procedure where account settings (e.g., target server name) are not known beforehand. As are result, an attempt 302 is made to resolve (e.g., via DNS forward lookup) several well-known host names based on the email domain as determined from the user's email address. Generally, these hostnames may be formed by prefixing a hostname to the domain name. For example, if the email address is user@mydomain.com, attempt to resolve hostnames such as mail.mydomain.com, smtp.mydomain.com, etc. Other prefixes that may be tried include email, pop, imap, pop3, imap4, exchange, owa, http, https, webmail, www, etc. It will be appreciated that, even where some of these prefixes might not be conventionally be associated with email servers, many times an entity will host different services at the same IP address. As a result, an email connection attempt made, for example, at a web server address, may be successful anyway.

If it is determined 304 that a targeted hostname resolves 302, then an attempt 306 can be made to connect to the targeted hostname. These attempts 306 may involve iterating through combinations of common protocols and security types. In one example of how the connection attempts 306 can be implemented, connection attempts may be made on well-known ports for POP, POP with SSL, IMAP, IMAP with SSL, SMTP, SMTP with SSL, SMTP with TLS, etc. The connection attempts 306 may involve connecting using the actual target protocol, or may use other techniques (e.g., SYN scan). If there is no success in connecting to well-known ports, a full port scan may be performed to see if the target host is remapping incoming ports. If it is determined that the host is listening on other ports (e.g., ports uncommonly used for email), then an additional step could be performed to determine whether protocols and security using on the affected ports. This additional scanning may take some time, and might preferably be performed after first obtaining user confirmation that such scanning should be performed.

Each successful connection determined at block 306 is added 308 to the database cache for this email domain. All possible server names can be searched for and saved in order to return as much information as possible. For example, if a server supports POP and IMAP, the algorithm may detect both of these protocols, instead of stopping after the first one. In some configurations, the database could track popularity of the different host names the contents and order of the searches can be refined based on the contents of the database cache. As noted in blocks 305 and 307, this iteration of name resolution 302 and connection attempts 306 may continue until name combinations have been exhausted or one sever has been determined for each protocol type (e.g., POP, IMAP, SMTP). In another arrangement, the iterations of 302, 306 may continue until at least servers that comply with the minimum set of needed protocols is found (e.g., POP/SMTP or IMAP/SMTP).

Figure 4:
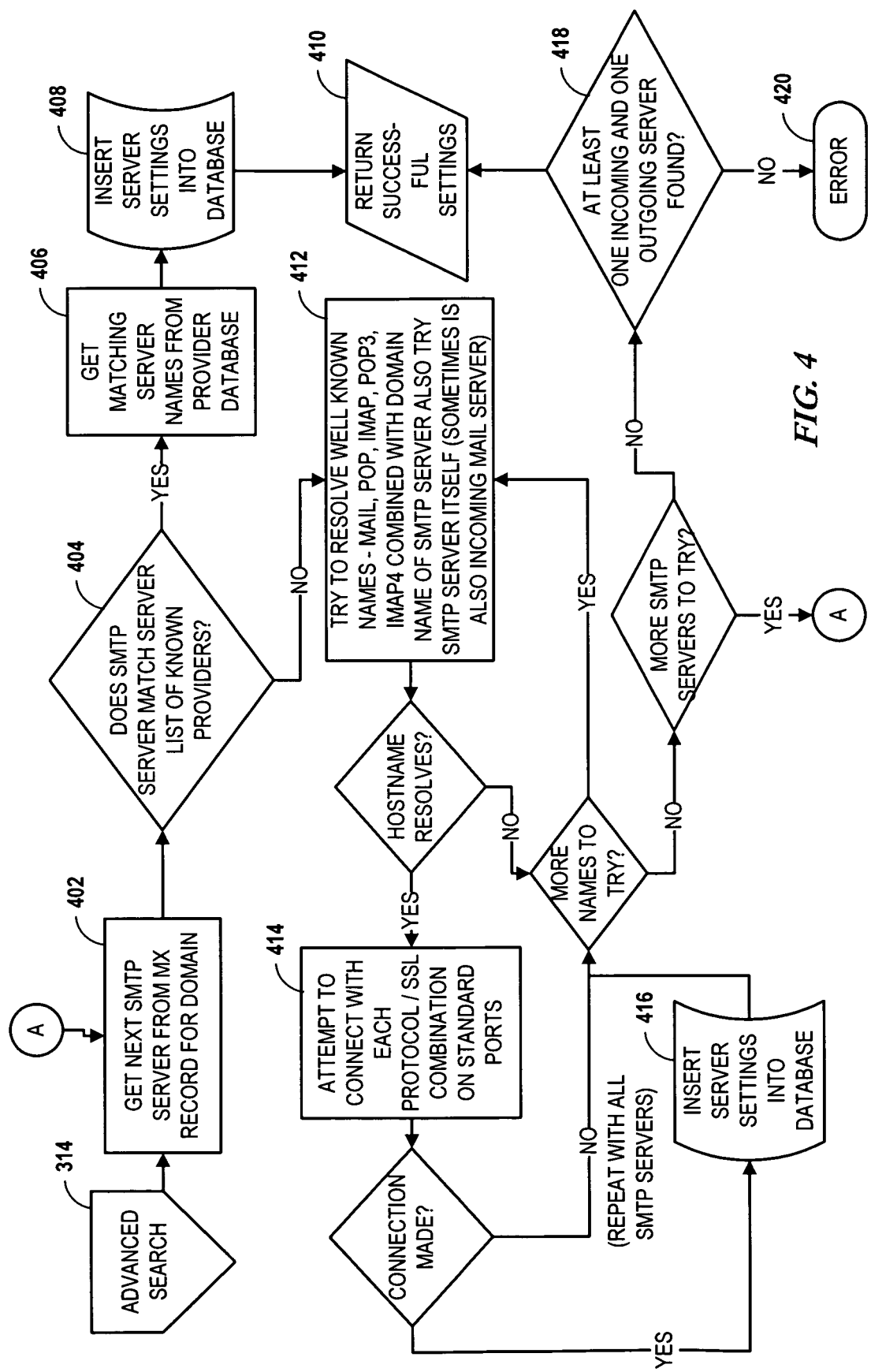
FIG. 4 is a flowchart illustrating a procedure for advanced mail server search according to an embodiment of the invention.

At the end of testing for well-known host names for the domain, the system determines 310 if at least one incoming and outgoing server is found for the domain. If there servers are found, the search is considered successful. In such a case, the settings are returned 312 and the procedure can continue as shown in FIG. 1. If at least one incoming and outgoing server is not found for the domain, then an advanced procedure 314 is performed. A flowchart illustrating details of the advanced procedure 314 according to an embodiment of the invention is shown in FIG. 4.

The advanced procedure 314 may first determine an SMTP server from the email domain by obtaining 402 a list of MX records via a DNS lookup of the email domain. It will then iterate the remaining logic over each SMTP server. First, it is determined 404 whether the SMTP server is in the list of known email providers (e.g., in database cache 128 or account detection service 130 in FIG. 1). If the server belongs to a known provider, then the system can return the settings associated with that provider as seen in blocks 406, 408, 410. For example, if mydomain.com has a SMTP server that matches the pattern *.google.com, this indicates that the domain is hosted by Gmail™. The Gmail server settings may have been previously entered into the database 130 by a system administrator, and thus the system can use these Gmail settings store 408 the server settings for this domain, and return 410 the settings to the calling application. For example, the provider database 130 may associate the result ".google.com in a MX record" with links to both "IMAP:imap.gmail.com" and "SMTP:smtp.gmail.com."

If it is determined 404 that the SMTP server does not match a list of known provider, then a discovery process 412 is performed, similar to the use of different prefixes 302 described in relation to FIG. 3. At this stage 412, the SMTP server data may provide additional clues as to the identity of the servers, or may itself provide the desired incoming mail services. If valid hostnames are found at 412, the connection attempts 414 and server updates 416 may be performed similarly to the procedures described in relation to FIG. 3. Again, if it is determined 418 that at least one incoming and outgoing server for each domain have been identified, those settings are returned 410, otherwise an error 420 is returned to the client/caller.

To provide an example of how the MX lookup 402 can improve server discovery, consider that at step 302 in FIG. 3, hostnames such as pop.mydomain.com, imap.mydomain.com, failed, and as a result procedure 314 is entered. The MX record obtained at 402 in FIG. 4 in this example results in smtp.mail.mydomain.com. Thus the MX record shows that the provider is using a sub-domain of "mail.mydomain.com." Based on this knowledge, the iteration at step 412 may incorporate this sub-domain by guessing at hostnames such as pop.mail.mydomain.com, imap.mail.mydomain.com, etc.

It will be appreciated that many variations on the procedure in FIGS. 2-4 may be introduced without departing from the spirit and scope of the illustrated embodiment. For example, actions of DNS lookup 412 and 414 may be performed in parallel by the use of lightweight processes, threads, etc. Additional enhancements may aid in account discovery in some situations. For example, individual users and small businesses that maintain their own email servers often have a single publicly routable IP address that is used for all Internet services, including external access to email accounts. A network address translation (NAT) firewall or the like may receive all incoming service connection requests from the Internet, as well as managing Internet traffic for clients behind the firewall. A NAT firewall may use port mapping to route inbound connection requests (e.g., for IMAP, POP, HTML, SMTP) to one or more internal servers.

In this particular scenario, the information needed to set up an email account may be available while the user device is coupled to a local are network (LAN) that is on the private side of the firewall. For example, if a mobile device has wireless local area networking (WLAN) capability, the device may be able to join the WLAN and use a utility such as "tracert" and/or an Internet-based lookup service to find the public IP address of the firewall. In such a case, the public IP address may be used by itself to test and configure clients as described in FIGS. 3 and 4. In other arrangements, it may still be desirable to determine a hostname associated with that IP address (e.g., the IP address may later change). In such a case, the device could do a reverse DNS lookup to find one or more hostnames associated with that IP address, and those hostnames may be selected and used as described hereinabove.

In the above described scenario, it may be desirable for the user to first indicate that they are on a work/private LAN where an account is maintained before attempting to determine a domain name (such data may not be useful on a public hotspot or a cellular data network, for example). If the user first indicates that they are on such a LAN when first configuring the device, the use of reverse DNS of a domain name of the network may also be helpful in entering the user's email address (e.g., prior to data input 202 in FIG. 2). The device, for example, may use a utility to determine the public IP address of the NAT, and then perform a reverse DNS lookup with this IP address. If the result in such a case is "gateway.mydomain.com" the device may list an email account option with "@mydomain.com" already filled in when user enters account setup. In such a case, the user only need fill in their username if the guess is correct.

In another variation on the above scenarios, the user may have multiple accounts that are accessible from the same servers, and the system may be able to configure both accounts using the same data. In one example, the user may have accounts on the same domain (e.g., joe@xyz.com and admin@xyz.com) in which case the user may be able to list multiple user names on one entry using a predefined syntax (e.g., "@xyz.com; joe, admin"). In other cases, the accounts may be maintained by the same servers but may have different account domains (e.g., joe@xyz.com and joe@zyx.org). In this case, the user may be able to enter both accounts at once (e.g., using semicolon delimited list) assuming there is one authentication that works for both accounts. Alternatively, the user could enter the account data serially, and account discovery procedures in FIGS. 2-4 may discover the same servers for the two accounts. In such a case, determining the server/protocol settings for the second account may be accelerated based on discovery of the server/protocol settings of the first account. This may be particularly true where the account discovery involves time-consuming procedures such as port scanning for non-standard port mappings.

Figure 5A:
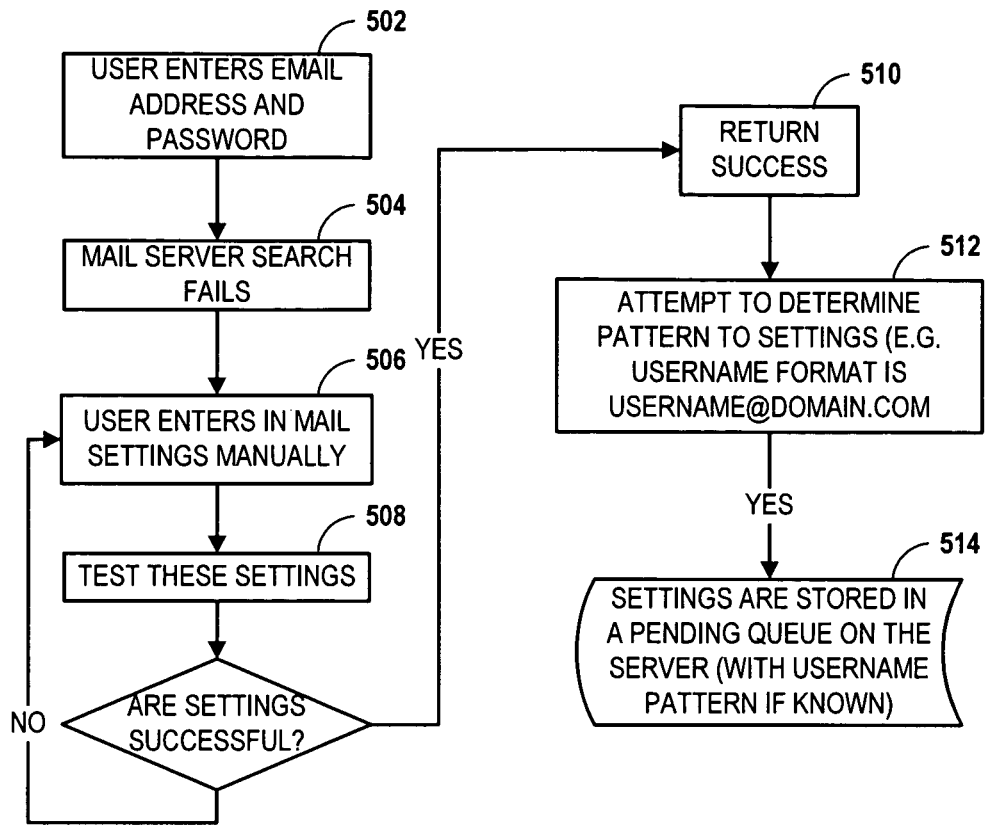
FIG. 5A is a flowchart illustrating a procedure for automatic learning according to an embodiment of the invention.
Figure 5B:
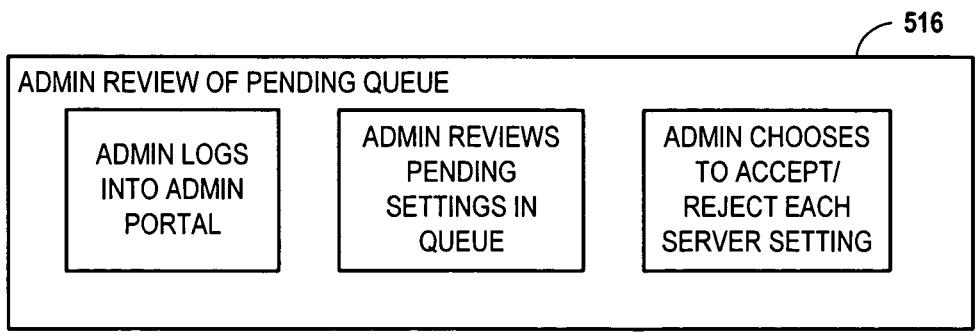
FIG. 5B is a block diagram illustrating administrative overview of automatic learning to an embodiment of the invention.

Systems, methods, and apparatus according to the example embodiments of the invention may also use a separate functionality called "auto-learning," which is shown in the flowchart of FIG. 5A. In this algorithm, the user enters 502 the email address and password, resulting in a failure 504 to determine one or both incoming and outgoing mail servers. The user is then prompted to enter 506 the mail settings manually and these are presented along with the email address to a centralized entity (e.g., network server) for testing 508. If the test is successful 510, the network server attempts 512 to determine a pattern based on the email address and username/hostname settings of the server. These identified patterns are then inserted 514 into a pending queue. An example of how such a queue is administered is shown as block 516 in FIG. 5B. The pending queue is checked by an administrator, and the settings can either be accepted into the database queue or rejected if deemed incorrect. This auto-learning function is also applicable to determining multiple accounts that may use the same server/protocols.

Many types of apparatuses may be used for account auto-configuration as described herein. For example, users are increasingly obtaining and configuring mobile devices to access these accounts. In reference now to FIG. 6, an example is illustrated of a representative mobile computing arrangement 600 capable of carrying out operations in accordance with embodiments of the invention. Those skilled in the art will appreciate that the exemplary mobile computing arrangement 600 is merely representative of general functions that may be associated with such mobile devices, and also that landline computing systems similarly include computing circuitry to perform such operations.

The processing unit 602 controls the basic functions of the arrangement 600, and may include one or more specialized or general-purpose logic units for processing instructions. The instructions may be stored with the processing unit 602 and/or in a program storage/memory 604. In one embodiment of the invention, the program modules associated with the storage/memory 604 are stored in non-volatile electrically-erasable, programmable read-only memory (EEPROM), flash read-only memory (ROM), hard-drive, etc. so that the information is not lost upon power down of the mobile terminal. The relevant software for carrying out mobile terminal operations in accordance with the present invention may also provided to the storage/memory 604 by computer readable medium and/or computer program products. Such software may also be transmitted to the mobile computing arrangement 600 via data signals, such as being downloaded electronically via one or more networks, such as the Internet and intermediate wireless network(s).

The mobile computing arrangement 600 may include hardware and software components coupled to the processing/control unit 602 for performing network data exchanges. The mobile computing arrangement 600 may include multiple network interfaces for maintaining any combination of wired or wireless data connections. The illustrated mobile computing arrangement 600 includes wireless data transmission circuitry for performing network data exchanges. This wireless circuitry includes a digital signal processor (DSP) 606 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 608, generally coupled to an antenna 610, transmits the outgoing radio signals 612 and receives the incoming radio signals 614 associated with the wireless device. These components may enable the arrangement 600 to join in one or more networks 615, including mobile service provider networks, local networks, and public networks such as the Internet.

The mobile computing arrangement 600 may also include an alternate network/data interface 616 coupled to the processing/control unit 602. The alternate network/data interface 616 may include the ability to communicate via secondary data paths using any manner of data transmission medium, including wired and wireless mediums. Examples of alternate network/data interfaces 616 include USB, Bluetooth, Ethernet, 602.11 Wi-Fi, IRDA, Ultra Wide Band, WiBree, etc. These alternate interfaces 616 may also be capable of communicating via the networks 615, or via direct and/or peer-to-peer communications links.

The processor 602 is also coupled to user-interface hardware 618 associated with the mobile terminal. The user-interface 618 of the mobile terminal may include, for example, a display 620 such as a liquid crystal display and a transducer 622. The transducer 622 may include any input device capable of receiving user inputs. The transducer 622 may also include sensing devices capable of producing media, such as any combination of text, still pictures, video, sound, etc. Other user-interface hardware/software may be included in the interface 618, such as keypads, speakers, microphones, voice commands, switches, touch pad/screen, pointing devices, trackball, joystick, vibration generators, lights, etc. These and other user-interface components are coupled to the processor 602 as is known in the art.

The program storage/memory 604 typically includes operating systems for carrying out functions and applications associated with functions on the mobile computing arrangement 600. The program storage 604 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 604 of the mobile computing arrangement 600 may also include software modules for performing functions according to embodiments of the present invention.

In particular, the program storage/memory 604 includes an account detection component 624 that is configured to receive account identifiers from a user via an integral user interface 626 and/or client applications 628. The clients 628 are generally user programs capable of interacting via the user interface 618, and may utilize network accounts with one or more servers 630. As described above, the clients 628 may include applications for email, telephony, text messaging, video, media playback, navigation, productivity, contacts, calendaring, content creation, etc. The clients 628 locally store account data 632 used to access the network accounts. The account data 632 may include data such as usernames, passwords, server identities, preferences, and other data related to network services 630. The clients 628 access the account detection component 624 via a common interface 629, such as an application program interface (API) that is accessed by way of system libraries and/or interprocess communications.

The account detection component 624 may have features similar to component 126 shown in FIG. 1. For example, the account detection component 624 can provide, on behalf of the clients 628, automatic detection of account settings based on particular user inputs, such as an account identifier and password. The detection component 624 may use a local cache database 634 that is pre-provisioned with account templates, such as known server names for given domains, known connection parameters for the servers, preferred account/connection types, hostname guessing rules, etc. The detection component 624 may update the database 634 based on its own operations with the clients 628 and user, and also from interaction with network components (e.g., account detection service 130 in FIG. 1). The detection component 624 may also be able to update the detection service 130 based on its own operations with the clients 628 and/or device user. The detection component 624 may include a database interface 624 for performing these update actions, as well as for performing reads/writes to one or more account databases 632.

The account detection component 624 may include network tools 638 for discovering, characterizing, and testing various services and devices of the networks 615. Those tools may include the types of tools 134 described in relation to FIG. 1, and other tools utilities known in the art, including telnet (e.g., for discovering/testing connections), service discovery registries and protocols (e.g., a Universal Description, Discovery and Integration registry for finding Web services), SNMP tools, "ping" and similar User Datagram Protocol (UDP)-based utilities, "whois", "nslookup", etc. These tools 638 may operate through a software interface 640 that provides access to the interface hardware 606, 608, 616, protocol stacks, connection management, and other operating-system level network functions.

Although the account detection examples described herein have been described in the context of email accounts, it will be appreciated that these concepts can be extended to other types of accounts. Such accounts may include content purchase (e.g., digital music store), instant messaging, VoIP, blogging, enterprise-specific accounts (e.g., customer relations management systems), etc. These accounts often have a minimum set of features in common with email accounts: user identifiers, passwords (or other authentication), particular servers and protocols used to provide the services, security settings, encryption settings. As such, the account detection component 624 may be extended by plug-ins 642 that define actions, data structures and behaviors of these different account types. The plug-ins 642 may operate via an interface 644 that manages insertion/deletion of plug-ins 642, and that provides a common API for communication between plug-ins 642 and account detection core components 624.

Figure 6:
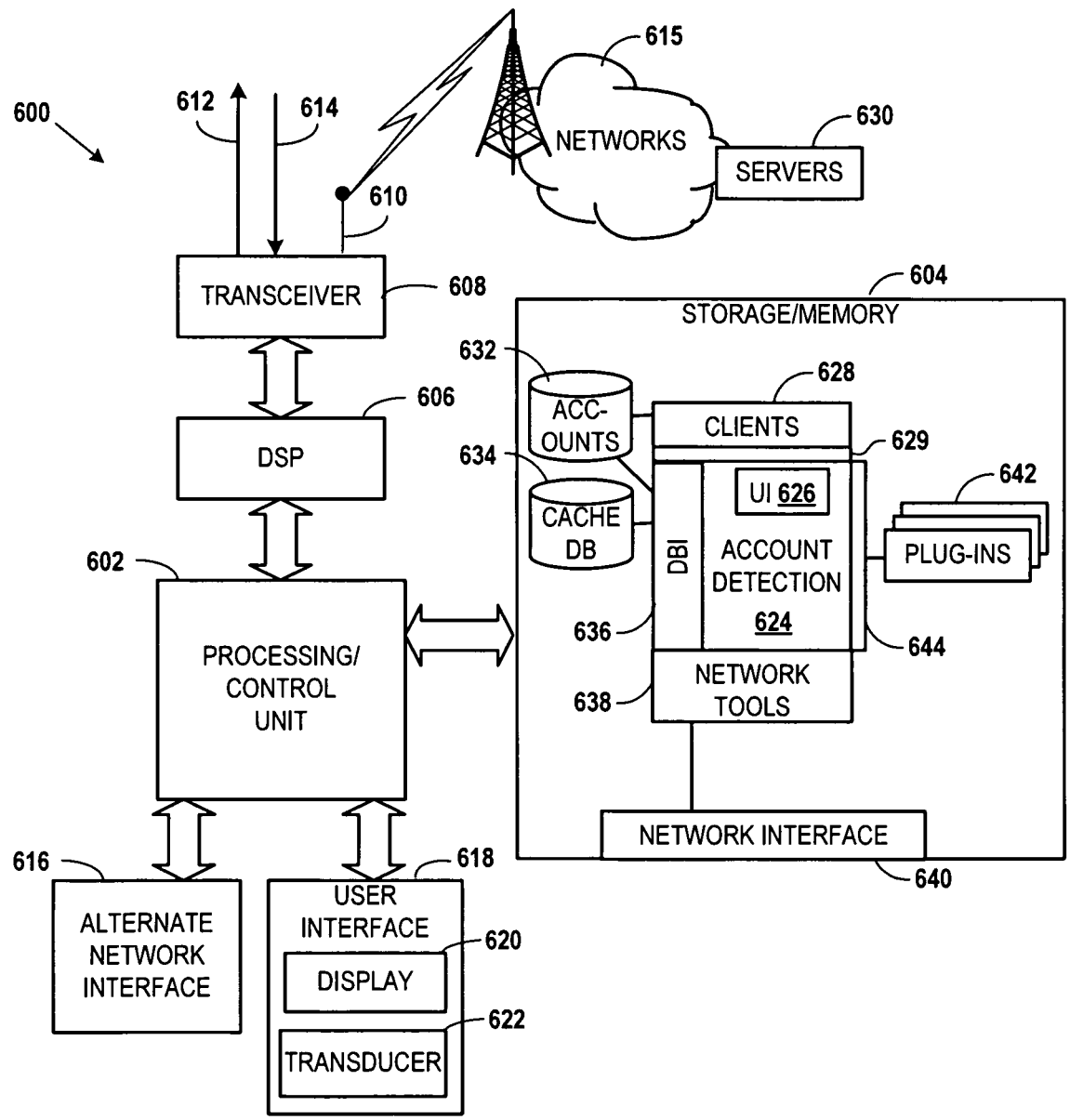
FIG. 6 is a block diagram of a user device according to an embodiment of the invention.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop and server computing devices similarly include a processor, memory, a user interface, and data communication circuitry. Thus, the present invention is applicable in any known computing structure where data may be communicated via a network.

Any of the steps described or illustrated herein may be implemented using executable instructions in a general-purpose or special-purpose processor and stored on a computer-readable storage medium (e.g., disk, memory, or the like) to be executed by such a processor. References to 'computer-readable storage medium' and 'computer' should be understood to encompass specialized circuits such as field-programmable gate arrays, application-specific integrated circuits (ASICs), signal processing devices, computer program products, and other devices.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
   determining at a user device one or more host names based, at least in part, on a domain name portion of an account identifier, wherein the one or more host names are assigned to one or more host servers of a service provider that provides an associated service;
   determining at the user device to initiate one or more connection attempts for registering a user account for the user device via a communication network to the associated service according to an application protocol with the one or more host names, the connection attempts involving iterating through a plurality of service provider host names and the one or more host names in combination with iterating through a plurality of application protocols and a plurality of ports of the one or more host servers corresponding to the one or more host names;
   determining at the user device that at least one of the one or more connection attempts results in at least one successful connection from the user device to the associated service for a first time;
   determining to store at the user device a service provider host name, host name, port and application protocol combination associated with the at least one successful connection in a settings database; and
   determining to configure a network account of the associated service at the user device based, at least in part, on the stored combination,
   wherein the stored combination is used to connect from the user device to the associated service for the user account.

2. The method of claim 1, wherein determining the one or more host names based on a domain name portion of the account identifier comprises:
   determining one or more prefixes based on the associated service; and
   determining to prefix the domain name portion of the account identifier with the one or more prefixes,
   wherein the connection attempts involve port scanning of one or more ports of the one or more host servers known for the application protocol.

3. The method of claim 2, further comprising:
   accessing a database of predetermined host names to determine a known service provider host, and one or more known host servers thereof that handle the associated service,
   wherein determining the one or more host names is further based on the known service provider host and the one or more known host servers,
   wherein the connection attempts involve subsequent port scanning of the one or more ports of the one or more host servers for one or more non-standard port mappings, when there is no successful connection via the one or more ports known for the application protocol.

4. The method of claim 3, wherein the connection attempts involve iterating through combinations of the plurality of service provider host names, the one or more host names, the plurality of ports, the plurality of protocols and a plurality of security types, and the method further comprising:
   determining to store at the user device a service provider host, host name, port, application protocol, and security type combination associated with the at least one successful connection in the settings database; and
   prompting for user confirmation of the port scanning of the one or more host servers for the one or more non-standard port mappings.

5. The method of claim 3, wherein the associated service comprises an email service and the account identifier comprises an email address, and one or more non-standard port mappings ports of the one or more host servers discovered via the subsequent port scanning includes one or more ports uncommonly used for emails.

6. The method of claim 1, wherein determining the one or more host names based on the domain name portion of the account identifier comprises:
   determining, via a domain name service, one or more mail exchange records associated with the domain name portion of the account identifier; and
   determining a simple mail transport protocol (SMTP) host name based on the one or more exchange records, and wherein determining the one or more host names comprises determining the one or more host names based on the SMTP host name.

7. The method of claim 6, wherein determining the one or more host names based on the SMTP host name comprises determining one or more incoming email host names based on a domain name portion of the SMTP host name, wherein the one or more incoming email host names are not preconfigured on the user device.

8. The method of claim 6, wherein a domain name portion of the SMTP host name is different than the domain name portion of the account identifier, and wherein determining the one or more host names based on the SMTP host name comprises accessing, based on the SMTP hostname, a database of predetermined service provider host names to determine a known service provider host, and one or more SMTP host servers thereof that handle the associated service.

9. The method of claim 1, further comprising receiving account authentication data entered by a user of the user account, wherein determining to initiate the one or more connection attempts further comprises determining to initiate one or more authentication attempts with the one or more host names based on the account authentication data.

10. The method of claim 1, wherein the at least one successful connection is a plurality of successful connections, the method further comprising:
   determining a preferred host name and application protocol combination associated with the plurality of successful connections; and
   determining to store the preferred host name and application protocol combination in the settings database.

11. The method of claim 1, wherein the stored combination is used to connect to the associated service for a plurality of user accounts, and the stored combination is used by one or more applications of the user device.

12. The method of claim 1, further comprising:
determining to track at the user device popularity of the one or more host names; and
determining to refine at the user device content and order of the one or more connection attempts based, at least in part, on the popularity.

13. The method of claim 1, further comprising:
determining at the user device to stop initiating the one or more connection attempts, either when host name and application protocol combinations have been exhausted, or when one server has been determined for each protocol type, or when servers that comply with a predetermined minimum set of protocols is found.

14. The method of claim 2, wherein the port scanning includes synchronization scanning of the one or more ports of the one or more host servers.

15. An apparatus comprising:
at least one processor; and
at least one memory including computer program code for one or more programs,
the at least one memory and the computer program code configured to, with the at least one processor, cause the apparatus embedded in a user device to perform at least the following,
determine one or more host names based, at least in part, on a domain name portion of an account identifier, wherein the one or more host names are assigned to one or more host servers of a service provider that provides an associated service;
determine to initiate one or more connection attempts for registering a user account for the user device via a communication network to the associated service according to an application protocol with the one or more host names, the connection attempts involving iterating through a plurality of service provider host names and the one or more host names in combination with iterating through a plurality of application protocols and a plurality of ports of the one or more host servers corresponding to the one or more host names;
determine that at least one of the one or more connection attempts results in at least one successful connection from the user device to the associated service for a first time;
determine to store at the user device a service provider host name, host name, port and application protocol combination associated with the at least one successful connection in a settings database; and
determine to configure a network account of the associated service at the user device based, at least in part, on the stored combination,
wherein the stored combination is used to connect from the user device to the associated service for the user account.

16. The apparatus of claim 15, wherein determining the one or more host names based on a domain name portion of the account identifier comprises:
determine one or more prefixes based on the associated service; and
determine to prefix the domain name portion of the account identifier with the one or more prefixes.

17. The apparatus of claim 15, wherein the apparatus is further caused to:
access a database of predetermined host names to determine a known service provider host, and one or more known host servers thereof that handle the associated service,
wherein determining the one or more host names is further based on the known service provider host and the one or more known host servers.

18. The apparatus of claim 15, wherein the associated service comprises an email service and the account identifier comprises an email address, and wherein determining the one or more host names based on the domain name portion of the account identifier comprises:
determine, via a domain name service, one or more mail exchange records associated with the domain name portion of the account identifier; and
determine a simple mail transport protocol (SMTP) host name based on the one or more exchange records, and wherein determining the one or more host names comprises determining the one or more host names based on the SMTP host name.

19. The apparatus of claim 18, wherein determining the one or more host names based on the SMTP host name comprises determining one or more incoming email host names based on a domain name portion of the SMTP host name, wherein the one or more host names are not preconfigured on the user device.

20. A non-transitory computer-readable storage medium carrying one or more sequences of one or more instructions which, when executed by one or more processors, cause an apparatus to at least perform the following steps:
determining at a user device one or more host names based, at least in part, on a domain name portion of an account identifier, wherein the one or more host names are assigned to one or more host servers of a service provider that provides an associated service;
determining at the user device to initiate one or more connection attempts for registering a user account for the user device via a communication network to the associated service according to an application protocol with the one or more host names, the connection attempts involving iterating through a plurality of service provider host names and the one or more host names in combination with iterating through a plurality of application protocols and a plurality of ports of the one or more host servers corresponding to the one or more host names;
determining at the user device that at least one of the one or more connection attempts results in at least one successful connection from the user device to the associated service for a first time;
determining to store at the user device a service provider host name, host name, port and application protocol combination associated with the at least one successful connection in a settings database; and
determining to configure a network account of the associated service at the user device based, at least in part, on the stored combination,
wherein the stored combination is used to connect from the user device to the associated service for the user account.

21. The non-transitory computer-readable storage medium of claim 20, wherein determining the one or more host names based on a domain name portion of the account identifier comprises:
determining one or more prefixes based on the associated service;
determining to prefix the domain name portion of the account identifier with the one or more prefixes, and wherein the apparatus is caused to further perform:

accessing a database of predetermined host names to determine a known service provider host, and one or more known host servers thereof that handle the associated service, wherein determining the one or more host names is further based on the known service provider host and the one or more known host servers.

22. The non-transitory computer-readable storage medium of claim 20, wherein the associated service comprises an email service and the account identifier comprises an email address, and wherein determining the one or more host names based on the domain name portion of the account identifier comprises:

determining, via a domain name service, one or more mail exchange records associated with the domain name portion of the account identifier; and determining a simple mail transport protocol (SMTP) host name based on the one or more exchange records, and wherein determining the one or more host names comprises determining the one or more host names based on the SMTP host name.

23. An apparatus comprising:

means for determining at a user device one or more host names based, at least in part, on a domain name portion of an account identifier, wherein the one or more host names are assigned to one or more host servers of a service provider that provides an associated service;

means for determining at the user device to initiate one or more connection attempts for registering a user account for the user device via a communication network to the associated service according to an application protocol with the one or more host names, the connection attempts involving iterating through a plurality of service provider host names and the one or more host names in combination with iterating through a plurality of application protocols and a plurality of ports of the one or more host servers corresponding to the one or more host names;

means for determining at the user device that at least one of the one or more connection attempts results in at least one successful connection from the user device to the associated service for a first time;

means for determining to store at the user device a service provider host name, host name, port and application protocol combination associated with the at least one successful connection in a settings database; and means for determining to configure a network account of the associated service at the user device based, at least in part, on the stored combination, wherein the stored combination is used to connect from the user device to the associated service for the user account.

\* \* \* \* \*